United States Patent Office 3,767,648
Patented Oct. 23, 1973

3,767,648
PRODUCTION OF ε-CAPROLACTAM AND
O-ACETYLCYCLOHEXANE OXIME
Isamu Fujita, Ikeda, Hisashi Tani, Higashiosaka, and
Shinichi Deguchi, Settsu, Japan, assignors to Kanegafuchi Boseki Kabushiki Kaisha
No Drawing. Filed Dec. 1, 1971, Ser. No. 203,824
Claims priority, application Japan, Dec. 22, 1970,
45/124,261
Int. Cl. C07d 41/06
U.S. Cl. 260—239.3 A                    2 Claims

ABSTRACT OF THE DISCLOSURE

This invention relates to a process for simultaneously producing ε-caprolactam and O-acetylcyclohexanoneoxime.

There are already known several processes for producing ε-caprolactam. Most of them are through Beckmann's rearrangement of cyclohexanoneoxime. The method utilizing such Beckmann's rearrangement reaction is an industrially established one. However, according to such method, the by-production of a large amount of ammonium sulfate in the reaction system is inevitable and it is necessary to consider the disposal of ammonium sulfate.

An object of the present invention is to provide a process for producing ε-caprolactam and O-acetylcyclohexanoneoxime.

Another object of the present invention is to provide a process wherein ε-caprolactam and O-acetylcyclohexanoneoxime can be produced simultaneously and easily.

We have now found that when cyclohexanoneoxime and N-acetyl-ε-caprolactam are reacted together in the presence of an acid there are obtained ε-caprolactam and O-acetylcyclohexanoneoxime.

The latter compound O-acetylcyclohexanoneoxime is known to be produced by the acetylation of cyclohexanoneoxime with acetic anhydride, but its industrial use has been not yet developed and therefore it has not yet been industrially produced.

However we have already found that O-acetylcyclohexanoneoxime would be easily subjected to Beckmann's rearrangement under a suitable condition (e.g. gaseous catalytic reaction in the presence of a solid acid catalyst such as silica-alumina) even without the use of sulfuric acid, so that there is produced N-acetyl-ε-caprolactam in a high yield.

Therefore when such Beckmann's rearrangement method is combined with the process of this invention, O-acetylcyclohexanoneoxime obtained by this invention can be easily converted into N-acetyl-ε-caprolactam, which can be used again as the starting material of this invention. Therefore, ultimately, ε-caprolactam can be produced in a high yield and with a high purity without the by-production of ammonium sulfate, starting from cyclohexanoneoxime.

Briefly, the method of this invention comprises reacting N-acetyl-ε-caprolactam with cyclohexanoneoxime in the presence of an acid and in a liquid phase.

The reaction of the present invention is represented by the following formula:

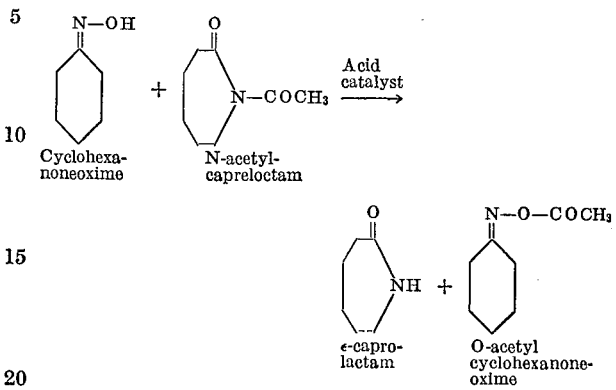

This reaction may be conducted by adding predetermined amounts of N-acetylcaprolactam, cyclohexanoneoxime and an acid and, if necessary, a solvent into a reactor in which the temperature and degree of agitation can be controlled.

In the present invention, many acids in a wide range from strong acids to weak acids can be used as catalysts. Thus there may be used inorganic acids such as sulfuric acid, nitric acid, hydrochloric acid, hydrofluoric acid, phosphoric acid, pyrophosphoric acid, perchloric acid and borofluoric acid; organic acids such as formic acid, acetic acid, propionic acid, butyric acid, valeric acid, caproic acid, oxalic acid, succinic acid, glutaric acid, adipic acid, monochloracetic acid, dichloracetic acid, trichloracetic acid, benzoic acid and other carboxylic acids; sulfonic acids such as benzenesulfonic acid and toluenesulfonic acid; acid ion-exchange resins; and Lewis acids such as boron trifluoride, aluminum chloride, zinc chloride and nickel chloride.

By using such acid as a catalyst, not only the reaction velocity can be accelerated but also the yield can be increased and, as the reaction can be conducted without undesirable side reaction and decomposition, the selectivity of the objective product can be increased.

The proper amount of use of such acid catalyst varies depending on the kind of the acid, but is, generally, in a range of 0.01 to 200%, preferably 0.1 to 100% based on the total weight of the starting materials, i.e. N-acetylcaprolactam and cyclohexanoneoxime. More particularly, when such strong acid as sulfuric acid or hydrochloric acid is used, a range of 0.01 to 30%, preferably 0.02 to 10% will be recommended. Further, for such weak acid as acetic acid or propionic acid, a range of 0.1 to 200%, preferably 1 to 100% is proper. For other acids, generally an amount intermediate between them is preferable.

If the amount of the acid catalyst is increased to be higher than that mentioned above, the reaction velocity will increase. However, the excess use will reduce the yields of ε-caprolactam and O-acetylcyclohexanoneoxime and will make the after-treatment for the separation of the products difficult.

Other factors influencing this reaction are the reaction temperature, reaction time, proportions of the starting materials and solvent.

The reaction temperature may be in a range of 0 to 120° C., particularly 5 to 80° C., more preferably 10 to 60° C. The higher the reaction temperature, the higher the reaction velocity and the shorter the reaction time. However, when the reaction temperature is higher than 120° C., an unidentified secondary reaction or decomposition reaction tends to occur and the yield of the objective product will reduce. When the reaction temperature is lower than 0° C. the reaction velocity becomes unduly low and the yield of the product is decreased.

The reaction time is influenced particularly by the reaction temperature. For example, when the reaction is conducted at 120° C. the reaction is almost completed within a few hours. If the reaction is further conducted at such high temperature the yield of the products, particularly that of O-acetylcyclohexanoneoxime is decreased. Usually the reaction time may be 0.2–5 hours at a temperature of 120° C. When the reaction temperature is 0° C. the reaction velocity is low and it takes several tens hours to complete the reaction. However an excessively long time of reaction is not preferable because the selectivity of the formation of O-acetylcyclohexanoneoxime would be decreased. Thus the reaction time should be properly selected depending upon the particular reaction temperature. Generally, however, the reaction time is about 10 minutes to 100 hours, particularly 1 to 50 hours, more preferably 2 to 40 hours.

The proportions of the starting materials, N-acetylcaprolactam and cyclohexanoneoxime may be in a range of 0.01 to 80 mols, preferably 0.1 to 15 mols of cyclohexanoneoxime per mol of N-acetylcaprolactam.

The reaction product is generally a mixture of four components, i.e. N-acetylcaprolactam, cyclohexanoneoxime, ε-caprolactam and O-acetylcyclohexanoneoxime. However, if either one of N-acetylcaprolactam and cyclohexanoneoxime is used in excess to the other at the time of the reaction, the content of the component used in the smaller amount in the resulting product will become so small that the product will become a mixture of substantially three components and therefore the operation for separating the desired compounds will become easy.

The starting material N-acetylcaprolactam is liquid at the normal temperature but cyclohexanoneoxime is a solid having a melting point of 90° C. Therefore, when cyclohexanoneoxime is used in excess or when the reaction is conducted at a low temperature, it will be difficult to obtain a uniform reaction system. In such case, it will be preferable to dissolve the mixture in an inert organic solvent.

It is preferable to employ such organic solvent which can dissolve N-acetylcaprolactam, cyclohexanoneoxime and acid used as the catalyst. Examples of such organic solvent are aromatic, aliphatic or alicyclic hydrocarbons, their halides, ethers, esters and ketones, more particularly benzene, toluene, cyclohexane; n-hexane, n-heptane, xylene, carbon tetrachloride, chloroform, ethylene dichloride, trichloroethylene, isopropyl ether tetrahydrofuran, dioxane, ethyl acetate, methyl ethyl ketone, tetrachlorethane, etc.

The amount of the solvent to be used may be 0–20 times, preferably 0.1–10 times the total weight of the starting materials N-acetyl-ε-caprolactam and cyclohexanoneoxime.

When the reaction is conducted under conditions explained as in the above, the resulting reaction product will be generally a mixture of N-acetylcaprolactam and cyclohexanoneoxime of the raw material system, and ε-caprolactam and O-acetylcyclohexanoneoxime of the product system and the acid used as catalyst and a solvent if used any.

From such reaction product the ε-caprolactam and O-acetylcyclohexanoneoxime may be separated by distillation, extraction, crystallization, neutralization or the like well known in the art for the separation of compounds, and cyclohexanoneoxime, N-acetylcaprolactam, acid catalyst and solvent may be returned to the reaction system for use as starting raw materials, to produce again ε-caprolactam and O-acetylcyclohexanoneoxime.

Thus, according to the invention, by the reaction of N-acetyl-ε-caprolactam and cyclohexanoneoxime are reacted together in the presence of an acid catalyst to produce ε-caprolactam and O-acetylcyclohexanoneoxime simultaneously in a high yield. The O-acetylcyclohexanoneoxime thus produced may be subjected to Beckmann's rearrangement to produce N-acetyl-ε-caprolactam, which may be used as the starting material of the present invention. Thus, ultimately, ε-caprolactam can be produced from cyclohexanoneoxime in a high yield and without the by-production of ammonium sulfate.

The present invention will be explained by means of the following examples in which the yield and selectivity are defined as follows:

Yield (percent) of ε-caprolactam
$$= \frac{\text{Number of mols of produced ε-caprolactam}}{\text{Number of mols of material N-acetylcaprolactam}} \times 100$$

Selectivity (percent) of ε-caprolactam
$$= \frac{\text{Number of mols of produced ε-caprolactam}}{\text{Number of mols of material N-acetylcaprolactam} - \text{Number of mols of unreacted N-acetylcaprolactam}} \times 100$$

Yield (percent) of O-acetylcyclohexanoneoxime
$$= \frac{\text{Number of mols of produced O-acetylcyclohexanoneoxime}}{\text{Number of mols of material cyclohexanoneoxime}} \times 100$$

Selectivity (percent) of O-acetylcyclohexanoneoxime
$$= \frac{\text{Number of mols of produced O-acetylcyclohexanoneoxime}}{\text{Number of mols of material cyclohexanoneoxime} - \text{Number of mols of unreacted cyclohexanoneoxime}} \times 100$$

EXAMPLE 1

A reflux condenser provided with a calcium chloride pipe was fitted to a two-necked flask of 100 cc. volume. A glass-coated rotor for electromagnetic agitation was placed into the flask.

11.3 g. (0.1 mol) of cyclohexanoneoxime, 15.5 g. (0.1 mol) of N-acetylcaprolactam and 2.0 g. of acetic acid (as a catalyst) were charged into the reactor and the mixture was heated on a hot water bath at 80° C. for 1.5 hours while being electromagnetically agitated. In this case, the acetic acid served not only as catalyst but also as a solvent.

After the reaction, the product was analyzed with a gas chromatograph (column filler PEG 20,000, 150° C.).

The results of the analysis are shown in Table 1. For comparison the results of a reaction conducted under the same conditions except that acetic acid was not used and the reaction time was 8 hours are also shown in Table 1.

As evident from Table 1, when acetic acid is used as a catalyst, the reaction time can be remarkably reduced from 8 hours to 1.5 hours and the yield of the objective products are increased.

TABLE 1

| Catalyst | Reaction time (hours) | ε-Caprolactam Yield (percent) | ε-Caprolactam Selectivity (percent) | O-acetylcyclo-hexanoneoxime Yield (percent) | O-acetylcyclo-hexanoneoxime Selectivity (percent) |
|---|---|---|---|---|---|
| Acetic acid | 1.5 | 75 | 91 | 76 | 89 |
| None | 8 | 64 | 91 | 64 | 89 |

Then 25 g. of the reaction product mixture were taken and the respective components were separated and identified by rectification. Upon distillation, there were obtained 1.1 g. of a cyclohexanoneoxime fraction (boiling point 104 to 105° C./12 mm. Hg), 0.2 g. of an N-acetylcaprolactam fraction (boiling point 82° C./4 mm. Hg), 6.5 g. of an O-acetylcyclohexanoneoxime fraction (boiling point 86 to 87° C./4 mm. Hg) and 7.0 g. of an ε-caprolactam fraction (boiling point 101 to 102° C./4 mm. Hg). The gas chromatograph retention time and infrared spectrum of each of these fractions perfectly coincided with those of the standard sample.

EXAMPLE 2

11.3 g. (0.1 mol) of cyclohexanoneoxime, 15.5 g. (0.1 mol) of N-acetylcaprolactam and 0.2 g. of P-toluenesulfonic acid (catalyst) were charged in the same reaction apparatus as in Example 1 and the mixture was allowed to react at reaction temperatures of 0, 20, 40, 60, 100 and 130° C. for 100, 40, 25, 10, 0.5 and 0.2 hour respectively. The results are shown in Table 2. The results of those cases where the catalyst is not used are also shown for comparison.

As shown in the table, the temperature range preferable for this reaction is 5 to 80° C., more preferably 10 to 60° C. It is evident also that by the use of an acid catalyst, the yield is remarkably increased and, the lower the temperature, the higher the selectivity. If the reaction temperature is too high, due to an unidentified side reaction and decomposition, the selectivity of the objective product will reduce. If the temperature is too low, the reaction velocity will become low.

TABLE 2

| Reaction temperature (° C.) | Reaction time (hrs.) | Catalyst | ε-Caprolactam Yield (percent) | ε-Caprolactam Selectivity (percent) | O-acetylcyclo-hexanoneoxime Yield (percent) | O-acetylcyclo-hexanoneoxime Selectivity (percent) |
|---|---|---|---|---|---|---|
| 130 | 0.2 | Present | 83 | 83 | 52 | 54 |
|  |  | Absent | 82 | 84 | 55 | 56 |
| 100 | 0.5 | Present | 81 | 84 | 67 | 69 |
|  |  | Absent | 76 | 84 | 62 | 69 |
| 60 | 10 | Present | 73 | 93 | 72 | 92 |
|  |  | Absent | 29 | 93 | 28 | 90 |
| 40 | 25 | Present | 67 | 94 | 69 | 95 |
|  |  | Absent | 13 | 93 | 10 | 95 |
| 20 | 40 | Present | 56 | 97 | 55 | 96 |
|  |  | Absent | 2 |  | 1 |  |
| 0 | 100 | Present | 33 | 98 | 33 | 97 |
|  |  | Absent | 0 |  | 0 |  |

EXAMPLE 3

11.3 g. (0.1 mol) of cyclohexanoneoxime, 15.5 g. (0.1 mol) of N-acetylcaprolactam and each of various acids shown in Table 3 as a catalyst were charged in the same reaction apparatus as in Example 1 and the mixture was heated while agitation at a reaction temperature of 60° C. for 5 hours. The reaction product was analyzed in the same manner as in Example 1 and the yields and selectivities of ε-caprolactam and O-acetylcyclohexanoneoxime were determined. The results are shown in Table 3.

As evident from the table, generally various inorganic acids and organic acids over a wide range from weak acids to strong acids, sulfonic acid series ion-exchange resins and such Lewis acids as boron trifluoride, aluminum chloride, zinc chloride and nickel chloride show remarkable effects.

TABLE 3

| Catalyst | Amount (mmol) | ε-Caprolactam Yield (percent) | ε-Caprolactam Selectivity (percent) | O-acetylcyclo-hexanoneoxime Yield (percent) | O-acetylcyclo-hexanoneoxime Selectivity (percent) |
|---|---|---|---|---|---|
| None |  | 29 | 94 | 28 | 92 |
| Sulfuric acid | 1 | 61 | 94 | 59 | 90 |
| Hydrochloric acid | 1 | 55 | 92 | 54 | 99 |
| Hydrofluoric acid | 1 | 54 | 92 | 52 | 82 |
| Phosphoric acid | 2 | 56 | 94 | 54 | 91 |
| Pyrophosphoric acid | 1 | 58 | 93 | 56 | 90 |
| Perchloric acid | 1 | 58 | 92 | 57 | 99 |
| Borofluoric acid | 1 | 58 | 92 | 56 | 81 |
| P-toluenesulfonic acid | 1 | 60 | 93 | 58 | 95 |
| Benezenesulfonic acid | 1 | 59 | 93.5 | 57 | 90.1 |
| Monochloracetic acid | 1 | 55 | 94 | 53 | 95 |
| Dichloracetic acid | 1 | 56 | 93 | 55 | 91.5 |
| Trichloracetic acid | 1 | 56 | 93 | 55 | 91.9 |
| Trifluoracetic acid | 1 | 57 | 92 | 55 | 80 |
| Formic acid | 10 | 50 | 93 | 48 | 93 |
| Acetic acid | 25 | 61 | 95 | 59 | 93 |
| Propionic acid | 25 | 60 | 95 | 59 | 93 |
| Butyric acid | 25 | 59 | 95 | 58 | 93 |
| Valeric acid | 25 | 57 | 94 | 56 | 92.5 |
| Caproic acid | 25 | 57 | 95 | 56 | 93 |
| Oxalic acid | 5 | 55 | 92 | 55 | 92.5 |
| Succinic acid | 10 | 53 | 93 | 52 | 91 |
| Glutaric acid | 10 | 53 | 93 | 52 | 91.5 |
| Adipic acid | 10 | 51 | 92 | 51 | 91.5 |
| Sulfonic acid series ion-exchange resin | (a) | 54 | 93 | 53 | 91 |
| Boron trifluoride | (b) | 51 | 92 | 50 | 90 |
| Aluminum chloride | 2 | 50 | 93 | 49 | 91.5 |
| Zinc chloride | 2 | 58 | 94 | 57 | 93 |
| Nickel chloride | 2 | 50 | 94 | 49 | 92 | a 2 milliequivalents.   b 2 mmol.

EXAMPLE 4

11.3 g. (0.1 mol) of cyclohexanoneoxime, 15.5 g. (0.1 mol) of N-acetylcaprolactam, 6 g. of tetrahydrofuran (as a solvent) and each of 0.01, 0.1, 1 and 3 g. of sulfuric acid (as a catalyst) were charged in the same apparatus as in Example 1 and the mixture was allowed to react at a temperature of 60 and 20° C. for 10 and 40 hours respectively. The results are shown in Table 4.

TABLE 4

| Reaction temperature (° C.) | Amount of sulfuric acid (g.) | ε-Caprolactam Yield (percent) | ε-Caprolactam Selectivity (percent) | O-acetylcyclo- hexanoneoxime Yield (percent) | O-acetylcyclo- hexanoneoxime Selectivity (percent) |
|---|---|---|---|---|---|
| 60 | 0.01 | 75 | 93 | 73 | 91 |
|    | 0.1  | 78 | 92 | 77 | 91 |
|    | 1    | 80 | 90.5 | 78 | 88 |
|    | 3    | 81 | 84 | 69 | 71 |
| 20 | 0.01 | 53 | 97 | 52 | 96 |
|    | 0.1  | 59 | 96 | 58 | 95 |
|    | 1    | 68 | 93 | 67 | 92.5 |
|    | 3    | 69 | 91 | 66 | 87 |

As in the table, the proper amount of sulfuric acid varies depending upon the reaction temperature. Thus, at a reaction temperature of 60° C., the amount of sulfuric acid in a range of 0.01 to 3% on the total weight of the starting raw materials of cyclohexanoneoxime and N-acetylcaprolactam is preferable. At a reaction temperature of 20° C., the preferable amount of sulfuric acid is more than that and is 0.5 to 10%. Generally, if the amount of sulfuric acid increases, the reaction velocity will become high. However, if the amount of sulfuric acid is excessively large, the selectivity of the product, particularly O-acetylcyclohexanoneoxime tends to reduce remarkably.

EXAMPLE 5

11.3 g. (0.1 mol) of cyclohexanoneoxime, 15.5 g. (0.1 mol) of N-acetylcaprolactam and each of 1.2, 6, 30 and 60 g. of acetic acid as a catalyst were charged in the same reaction apparatus as in Example 1 and the mixture was allowed to react at a temperature of 60 or 20° C. for 10 or 40 hours respectively. The results are shown in Table 5.

TABLE 5

| Reaction temperature (° C.) | Amount of acetic acid (g.) | ε-Caprolactam Yield (percent) | ε-Caprolactam Selectivity (percent) | O-acetylcyclo- hexanoneoxime Yield (percent) | O-acetylcyclo- hexanoneoxime Selectivity (percent) |
|---|---|---|---|---|---|
| 60 | 1.2 | 74 | 93 | 73 | 92 |
|    | 6   | 78 | 93 | 77 | 91.5 |
|    | 30  | 78 | 93 | 75 | 90 |
|    | 60  | 76 | 92 | 73 | 88 |
| 20 | 1.2 | 55 | 98 | 55 | 98 |
|    | 6   | 68 | 97 | 68 | 96.5 |
|    | 30  | 74 | 95 | 73 | 94 |
|    | 60  | 70 | 94 | 69 | 92 |

As shown in the table, the proper amount of use of acetic acid varies also depending upon the temperature. Thus, at a temperature of 60° C., it is preferable to use acetic acid in an amount of 3 to 100% on the total weight of the starting raw materials of cyclohexanoneoxime and N-acetylcaprolactam. At a reaction temperature of 20° C., it is larger than that and is 20 to 100%. A larger amount of acetic acid can also be used but, in such case, due to the diluting effect by acetic acid, the reaction velocity will become rather slow.

EXAMPLE 6

33.9 g. (0.3 mol) of cyclohexanoneoxime, 15.5 g. (0.1 mol) of N-acetylcaprolactam, 0.4 g. of P-toluenesulfonic acid and 12 g of toluene (as a solvent) were charged in the same reaction apparatus as in Example 1 and the mixture was allowed to react at a temperature of 40° C. for 24 hours while being agitated.

Upon analysis of the reaction product (except the solvent), the composition was found to be 53% cyclohexanoneoxime, 2% N-acetylcaprolactam, 21% ε-caprolactam and 20% O-acetylcyclohexanoneoxime. This corresponds to a yield of 83% and a selectivity of 93% of ε-caprolactam and a yield of 27% and a selectivity of 88% of O-acetylcyclohexanoneoxime.

EXAMPLE 7

11.3 g. (0.1 mol) of cyclohexanoneoxime, 31.0 g. (0.2 mol) of N-acetylcaprolactam and 0.2 g. of phosphoric acid were charged in the same reaction apparatus as in Example 1 and the mixture was allowed to react at a temperature of 60° C. for 5 hours while being agitated.

Upon analysis of the reaction product, its composition (except the solvent) was found to be 2% cyclohexanoneoxime, 36% N-acetylcaprolactam, 28% ε-caprolactam and 26% O-acetylcyclohexanoneoxime. This corresponds to a yield of 42% and a selectivity of 90% of ε-caprolactam and a yield of 79% and a selectivity of 85% of O-acetylcyclohexanoneoxime.

EXAMPLE 8

11.3 g. (0.1 mol) of cylclohexanoneoxime, 15.5 g. (0.1 mol) of N-acetylcaprolactam and 0.2 g. of P-toluenesulfonic acid were mixed and added with 20 cc. of each of various organic solvents shown in Table 6. The mixture was heated at a temperature of 60° C. for 8 hours. The results are shown in Table 6.

As apparent from the table, in case benzene, toluene, xylene, ethylene dichloride, trichlorethylene, chloroform or carbon tetrachloride is used as a solvent, the amount of production of ε-caprolactam and O-acetylcyclohexanoneoxime will increase to be somewhat larger than in the case where no solvent is used. Further, if an acid catalyst is added to such system where a solvent (e.g. dimethylformamide, tetrahydrofuran, dimethylsulfoxide or hexamethyl phosphoramide) with which the reaction velocity is low (and hence the yields of ε-caprolactam and O-acetylcyclohexanoneoxime will be low) in the absence of catalyst, the objective product will be obtained at a high yield not so different from such case where the solvent is not used.

TABLE 6

| Solvent | ε-Caprolactam | | O-acetylcyclo-hexanoneoxime | |
|---|---|---|---|---|
| | Yield (percent) | Selectivity (percent) | Yield (percent) | Selectivity (percent) |
| None | 78 | 92 | 76 | 89.5 |
| Benzene | 82 | 91 | 81 | 90 |
| Toluene | 82 | 91 | 80 | 89 |
| Xylene | 81 | 91.5 | 79 | 89.5 |
| Ethylene dichloride | 81 | 91.5 | 78 | 88.5 |
| Trichlorethylene | 82 | 91.5 | 79 | 88.5 |
| Chloroform | 82 | 92 | 78 | 89.5 |
| Carbon tetrachloride | 82 | 92.5 | 78 | 88.5 |
| n-Heptane | 78 | 90 | 76 | 88 |
| Acetone | 77 | 92.5 | 71.5 | 89 |
| Methyl ethyl ketone | 77 | 93 | 71 | 86.5 |
| Ethyl acetate | 77 | 92 | 73 | 88 |
| Dioxane | 78 | 92 | 75 | 88.5 |
| Tetrahydrofuran | 78 | 91.5 | 76 | 89 |
| Dimethylformamide | 76 | 91 | 73 | 88 |
| Dimethylsulfoxide | 76 | 90.5 | 74 | 88 |
| Hexamethylphosphoramide | 75 | 92 | | |

What we claim is:

1. A process for producing ε-caprolactam and O-acetylcyclohexanoneoxime characterized by reacting cyclohexanoneoxime with N-acetylcaprolactam in a liquid phase, at a temperature of 0–120° C., for a reaction time of 10 minutes to 100 hours, in the presence of 0 to 20 times the total weight of the N-acetylcaprolactam and the cyclohexanoneoxime of an organic solvent and 0.01–200% based on the total weight of the N-acetylcaprolactam and the cyclohexanoneoxime of an acid selected from the group consisting of sulfonic acids, inorganic acids, carboxylic acids, acid ion exchange resins and Lewis acids.

2. The process as claimed in claim 1 wherein the inorganic acid is sulfuric acid, nitric acid, hydrochloric acid, hydrofluoric acid, phosphoric acid, pyrophosphoric acid, perchloric acid or borofluoric acid; the carboxylic acid is formic acid, acetic acid, propionic acid, butyric acid, valeric acid, caproic acid, oxalic acid, succinic acid, glutaric acid, adipic acid, monochloracetic acid, dichloracetic acid, trichloracetic acid, trifluoracetic acid or benzoic acid; the sulfonic acid is benzene sulfonic acid or toluene sulfonic acid; the Lewis acid is boron trifluoride, aluminum chloride, zinc chloride or nickel chloride; said cyclohexanoneoxime being used in an amount of 0.01 to 80 mols per mol of N-acetyl caprolactam.

References Cited

UNITED STATES PATENTS 3,689,477  9/1972  Fujita et al. _____ 260—239.3

HENRY R. JILES, Primary Examiner

R. T. BOND, Assistant Examiner

U.S. Cl. X.R.

260—239.3 R, 566 AE, 566 A